Sept. 8, 1964  R. RONCERAY  3,147,850
ELEVATOR FLIGHT
Filed Dec. 7, 1961
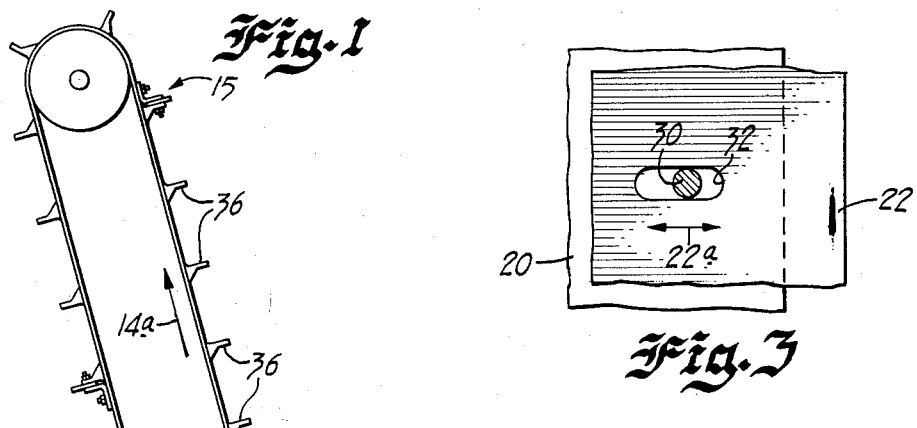
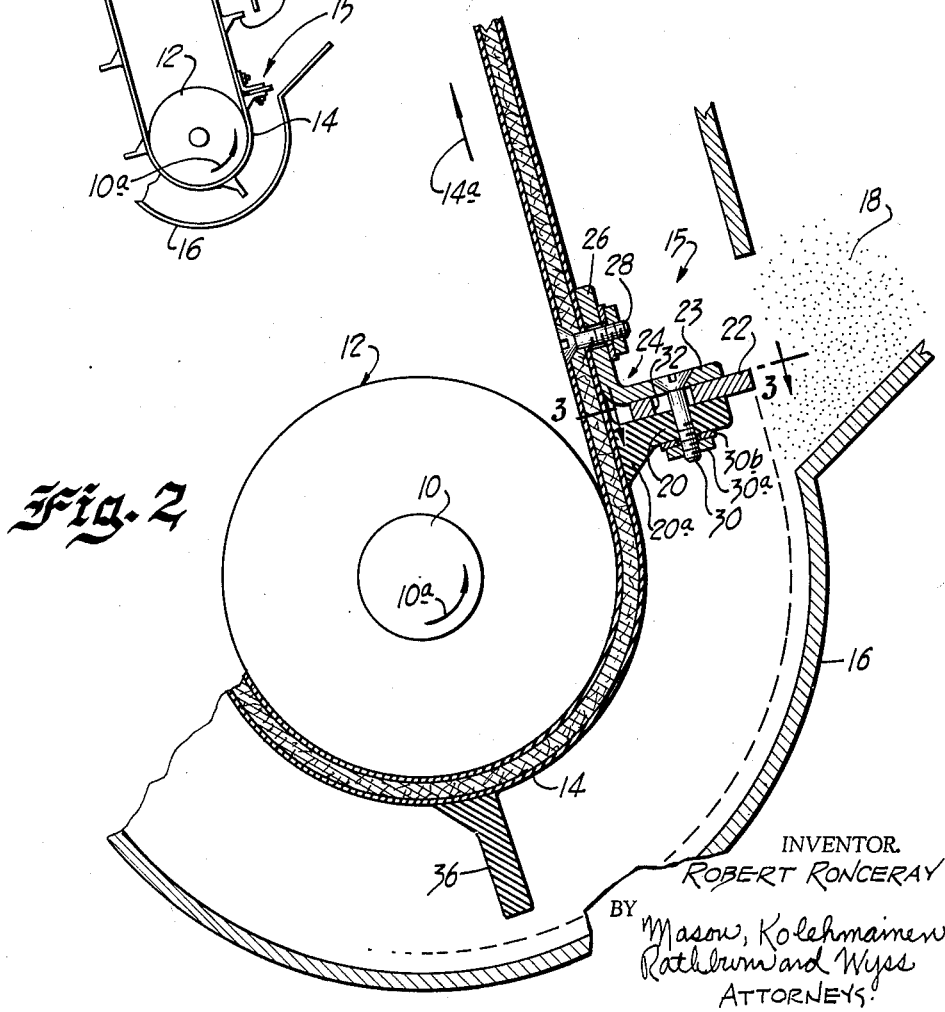
INVENTOR.
ROBERT RONCERAY
BY Mason, Kolehmainen,
Rathburn and Wyss
ATTORNEYS

United States Patent Office
3,147,850
Patented Sept. 8, 1964

3,147,850
ELEVATOR FLIGHT
Robert Ronceray, Choisy-le-Roi, France, assignor to Herbert Simpson Corporation, Chicago, Ill., a corporation of Illinois
Filed Dec. 7, 1961, Ser. No. 157,650
11 Claims. (Cl. 198—168)

This invention pertains to a new and improved elevator flight and more particularly to a new and improved conveyor flight of the type adapted for use in a belt type elevator used to elevate and aerate sand or other granular materials having a tendency to pack.

One of the problems encountered when a belt type elevator is used to elevate materials which have a tendency to pack, such as foundry sand or the like, is that the material collects in the bottom of the elevator causing excessive drag and wear on the elevator belt and reducing the capacity of the elevator.

The use of rubber flights which are vulcanized or otherwise attached to an elevator belt is described in the copending U.S. patent application, Serial No. 12,477 of Axel G. Granath, filed March 2, 1960, entitled "Method and Apparatus for Treating Sand," and assigned to the same assignee as this application. The apparatus there described is subject to some difficulty with respect to the build up of sand in the bottom of the elevator due to the flexing of the flights to permit the material to pack and accumulate in the vicinity of the lower bend of the conveyor. When metal flights are used, this difficulty is reduced but the edges of the flights wear rapidly necessitating frequent replacement.

It is therefore an object of the present invention to provide a new and improved flight to be used in high speed conveyors for elevating and aerating said and other material, which flights will not allow the material to pack excessively in the bottom of the elevator and yet will not wear rapidly.

Another object of the present invention is to provide a new and improved elevator flight which is resistant to abrasion and can be readily adjusted to compensate for wear without the necessity of replacement of the flight.

Another object of the present invention is to provide a new and improved flight which is somewhat resilient in order to absorb shock but, at the same time, is not flexible enough to allow material to pack and build up in the elevator.

The foregoing and other objects of the present invention are realized by providing a conveyor or elevator flight comprising a resilient backing adapted to be vulcanized or otherwise attached to the outer surface of the conveyor belt and extending outwardly therefrom. The resilient backing on its upper surface adjustably supports a scraper blade made of an abrasion resistant material which serves to dig into any packed sand in order to prevent the build-up of a sand mass. To provide rigidity to the flight, a bracing member of rigid material is secured to the outer surface of the belt and has an outwardly extending portion secured both to the scraper blade and to the backing.

Other objects and features of the present invention will become apparent from the following detail description taken in conjunction with the accompanying drawing in which:

FIG. 1 is a fragmentary, sectional view taken along the longitudinal axis of an elevator or conveyor belt illustrating a belt carrying several flights at least one of these flights being characterized by the features of the present invention.

FIG. 2 is an enlarged, fragmentary, sectional view showing the lower bend of the conveyor illustrated in FIG. 1 and also showing one of the flights embodying the features of the present invention; and FIG. 3 is a fragmentary, cross sectional view taken along a line substantially corresponding to the line 3—3 of FIG. 1 and looking in the direction of the arrows.

Referring now to the drawing, there is illustrated in FIGS. 1 and 2 the boot section of an elevator having a boot shaft 10 carrying a pulley 12 and rotating in the direction indicated by the curved arrow pointed line 10a. An endless elevator or conveyor belt 14, preferably of the type having several vulcanized plys or laminations and being rubber covered on both surfaces, is shown in engagement with the pulley 12 and moving upwardly as indicated by the straight arrow pointed line 14a.

A portion of an elevator casing 16 defines a feeder opening 18 through which sand or other material is fed to the elevator from a hopper or other source not shown. In this connection, the elevator and the casing may be of the type described and claimed in the copending Granath application identified above.

The belt 14 carries a plurality of spaced apart flights at least some of which, identified generally by the reference numeral 15, are characterized by the features of the present invention. As is shown in FIG. 2, each of the flights 15 comprises a resilient backing 20 formed of rubber or the like and extending outwardly from the outer surface of the belt 14. The angle defined between the upper surface of the backing 20 and the outer surface of the belt 14 is illustrated in FIG. 1 as a right angle but it should be understood that the angle could be more or less than 90° as desired for a given material or belt speed.

A portion 20a of the backing 20 adjacent the belt 14 is somewhat thicker than the outer edge of the backing in order to provide a larger surface for vulcanizing the backing to the surface of the belt. However, other means such as bolting or riveting could be used for attaching the resilient backing 20 to the belt 14.

Attached to the upper surface of the resilient backing 20 is a scraper blade 22 formed by a flat strip of abrasion resistant material such as manganese steel or a material such as the type sold under the trademark Stellite having from 75% to 90% cobalt and 10% to 25% chromium. The scraper blade 22 is clamped between the upper surface of the resilient backing 20 and a leg 23 of an L-shaped brace 24 having its other leg 26 secured to the belt 14. More specifically, the brace 24 is constructed of a rigid material such as metal or the like and has its leg 26 secured to the belt by bolts 28 or the like. A section of angle iron can be preferably utilized for the construction of the brace 24 although other material could be used. Bolts 30 are employed to apply clamping pressure through the backing 20 to hold the scraper 22 firmly in position between the leg 23 and the backing. Each of the latter bolts extends through an aperture in the leg 23, through an elongated slot 32 in the blade 22 and through an opening in the backing 20 and has a nut threaded onto its downwardly protruding end 30a, which nut is seated against a washer 30b. The slots 32 are elongated in a direction extending parallel to the leg 23 in order to permit the scraper blade to be slideably adjusted in the direction of the arrow pointed line 22a in FIG. 2 when the bolt 30 is loosened. Thus, to compensate for wear on the scraper blade 22 or to provide the proper clearance distance between the scraper blade and the interior surface of the elevator casing 16, the bolt 30 may be loosened and the scraper blade may be extended or retracted by moving it between the brace 24 and the backing 20 until its extreme outer end is properly positioned.

In operation of the elevator as the belt 14 moves upwardly in the direction indicated by the arrow pointed line 14a, sand entering the casing 16 through the opening 18 impinges on the outer exposed surface of the scraper member 22 and is carried upward on the flight. The outer edge of the scraper member 22 is subjected to the greatest abrasive action and, because the scraper member 22 is constructed of abrasion resistant material, very little wearing away of the member 22 occurs. Over a period of time, however, sufficient abrasive action may cause erosion of a portion of the scraping edge and, at this time, the bolts 30 may be loosened and the scraper blade 22 can be moved outwardly towards the right as viewed in FIGS. 1 and 2 for a sufficient distance to compensate for the wear whereupon the bolt may be retightened to again lock the blade 22 in position. This adjustment maintains the clearance between the scraper member 22 and the elevator casing 16 relatively constant and, hence, avoids excessive packing of sand in the elevator boot with its resultant disadvantages.

Use of the resilient backing 20 in combination with the brace 24 to support the scraper 22 makes the mounting for the scraper sufficiently flexible with respect to the belt 14 to withstand shocks when heavy loads are dumped in the elevator but not flexible enough to allow material to pack in the bottom of the elevator. When heavy resistance is met by the outer edge of the scraper 22, it will deflect slightly downwardly away from the lower surface of the leg 23 whereupon the resilient backing 20 will be compressed and deflected in the region between the lower surface of the scraper 22 and the nut 30a and the washer 30b associated with the bolt 30. In this manner, the energy of the shock load applied on the scraper blade 22 is absorbed by the resilient backing member 20 without excessive stresses on the belt 14. The adjustment of the blade as mentioned above insures that only a controlled and very small thickness of material will build up during operation and any excess will be easily broken off by the blade 22.

An elevator flight of the type described in this application could be advantageously used in the device described and claimed in the previously cited Granath application, and in such a device, as is shown in FIG. 1, the improved flight of the present invention could be used in conjunction with rubber flights, every fifth or sixth flight being of the type herein described and being adjusted to have a smaller clearance than the other rubber flights 36. By use of this combination less power is required to run the elevator device since not all of the flights in the device would be scraping the material in the bottom of the boot.

While a particular embodiment of the invention has been shown, it will be understood, of course, that it is not desired to limit the invention thereto since many modifications will readily occur to those skilled in this art, and it is therefore contemplated by the appended claims to cover any such modifications as fall within the true spirit and scope of the invention.

What is claimed as new and is desired to be secured by Letters Patent of the United States is:

1. An elevator flight of the type adapted for use in an elevator for elevating material such as sand or the like and having an endless conveyor belt; said flight comprising a flexible backing attached to and extending outwardly from the conveyor belt, a rigid brace attached to and extending outwardly from said conveyor belt and spaced from said backing, and a scraper secured between said backing and said brace and having an end portion extending outwardly from the outer ends of said backing and said brace.

2. The flight defined by claim 1 wherein said backing is formed of resilient material to permit slight deflection of said flight when the latter encounters a heavy load.

3. The flight defined by claim 1 wherein the backing is formed of rubber and has a thickened portion lying adjacent said belt to facilitate vulcanization of the backing to the belt.

4. An elevator flight as described in claim 1 above, additionally comprising means for adjustably securing said scraper between said backing and said brace whereby the outward extent of said end portion of said scraper from said belt may be adjusted.

5. An elevator flight of the type adapted for use in an elevator employing an endless rubber covered belt; said flight comprising a resilient backing extending outward from and vulcanized to the outer surface of said belt; a rigid L-shaped brace having one leg extending across and attached to the outer surface of said belt at a position spaced from said backing; the other leg of said brace extending outwardly from said belt and generally parallel to said backing, a scraper blade constructed of abrasion resistant material secured between said other leg of said brace and said backing and having an outer end portion extending outwardly beyond the ends thereof; and means for adjustably securing said flight member between said brace and said backing and operable to adjust the outward extent of said outer end portion.

6. The flight defined by claim 5 wherein the backing is formed of rubber and has a thickened portion lying adjacent said belt to facilitate vulcanization of the backing to the belt.

7. An elevator flight of the type adapted for use in an elevator for elevating bulk material and having an endless rubber covered belt; said flight comprising a resilient backing formed of rubber and having a surface extending outwardly from said belt, said backing having a thickened web portion adjacent said belt and vulcanized thereto, an angle shaped metal brace having one leg spaced from said backing and extending outwardly from the belt and parallel to said surface of said backing, a scraper bar of abrasion resistant material secured between said brace leg and said backing, and having an outer edge extending therebeyond, said scraper bar having a plurality of longitudinally spaced slots defined therein, threaded means operatively associated with said brace and said backing and extending through said slots for adjustably securing said scraper bar to said backing and said brace.

8. An endless belt conveyor having a plurality of spaced apart flights thereon extending outwardly from the outer surface thereof comprising a first group of flights being formed exclusively of resilient material and a second group of flights; each of the flights in said second group comprising a flexible backing attached to and extending outwardly from the conveyor belt, a flexible brace attached to and extending outwardly from said conveyor belt and spaced from said backing, and a scraper secured between said backing and said brace and having an end portion extending outwardly from the outer ends of said backing and said brace.

9. The apparatus defined by claim 8 wherein said backing is formed of resilient material to permit slight deflection of said flight when the latter encounters a heavy load.

10. The apparatus defined by claim 8 wherein the backing is formed of rubber and has a thickened portion lying adjacent said belt to facilitate vulcanization of the backing to the belt.

11. Apparatus as described in claim 8 wherein each of the flights in said second group, additionally includes means for adjustably securing said scraper between said backing and said brace whereby the outward extent of said end portion of said scraper from said belt may be adjusted.

References Cited in the file of this patent

UNITED STATES PATENTS

| | | |
|---|---|---|
| 886,065 | Nicholson | Apr. 28, 1908 |
| 1,590,884 | Bryant | June 29, 1926 |
| 2,809,742 | Holz | Oct. 15, 1957 |
| 2,966,254 | Kaiser | Dec. 27, 1960 |

UNITED STATES PATENT OFFICE
CERTIFICATE OF CORRECTION

Patent No. 3,147,850                          September 8, 1964

Robert Ronceray

It is hereby certified that error appears in the above numbered patent requiring correction and that the said Letters Patent should read as corrected below.

Column 4 line 49, for "flexible" read -- rigid --; line 63, after "group" strike out the comma.

Signed and sealed this 30th day of March 1965.

(SEAL)
Attest:

ERNEST W. SWIDER
Attesting Officer

EDWARD J. BRENNER
Commissioner of Patents